/ 
(12) United States Patent
Tanabe et al.

(10) Patent No.: US 10,523,142 B2
(45) Date of Patent: Dec. 31, 2019

(54) MOTOR CONTROL APPARATUS

(71) Applicant: Mitsubishi Electric Corporation, Tokyo (JP)

(72) Inventors: Akira Tanabe, Tokyo (JP); Munehiro Murata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/322,976

(22) PCT Filed: Dec. 21, 2017

(86) PCT No.: PCT/JP2017/045879
§ 371 (c)(1),
(2) Date: Feb. 4, 2019

(87) PCT Pub. No.: WO2019/123594
PCT Pub. Date: Jun. 27, 2019

(65) Prior Publication Data
US 2019/0363652 A1   Nov. 28, 2019

(51) Int. Cl.
*H02P 6/17* (2016.01)
*G01P 3/44* (2006.01)

(52) U.S. Cl.
CPC . *H02P 6/17* (2016.02); *G01P 3/44* (2013.01)

(58) Field of Classification Search
CPC ..................................... H02P 6/17; G01P 3/44
USPC .............................. 318/400.04, 400.01, 700
See application file for complete search history.

(56) References Cited

U.S. PATENT DOCUMENTS 8,204,641 B2 *  6/2012  Kawakami ........... G05B 13/026
                                                        123/406.12
2014/0019009 A1     1/2014  Kogiso

FOREIGN PATENT DOCUMENTS

| JP | 2002-112566 A | 4/2002 |
| JP | 2003-035566 A | 2/2003 |
| JP | 2003-118086 A | 4/2003 |
| JP | 2004-317261 A | 11/2004 |
| JP | 2012-104047 A | 5/2012 |

(Continued)

OTHER PUBLICATIONS

International Search Report dated Mar. 27, 2018 for PCT/JP2017/045879 filed on Dec. 21, 2017, 2 pages excluding English translation.

(Continued)

*Primary Examiner* — David Luo
(74) *Attorney, Agent, or Firm* — Xsensus LLP

(57) ABSTRACT

A motor control apparatus is an apparatus that controls a motor that drives a machine apparatus that moves a subject to be moved, and includes a resolution conversion unit that converts, on the basis of a ratio of resolution of a first detector that detects a position of an object and resolution of a second detector that detects a position of the object, a detection signal that indicates the position of the object that is detected by the second detector to a signal of the resolution of the first detector. The motor control apparatus further includes a current control unit that controls a voltage to be applied to the motor on the basis of a command signal that specifies a destination position of the subject to be moved and the signal obtained by the conversion performed by the resolution conversion unit on the detection signal.

2 Claims, 4 Drawing Sheets

(56) References Cited

FOREIGN PATENT DOCUMENTS

JP  2012-211857 A  11/2012
JP  2013-005624 A  1/2013

OTHER PUBLICATIONS

Decision to Grant mailed for Japanese Patent Application No. 2018-522148, dated Aug. 21, 2018, 5 pages including English Translation.

* cited by examiner

MOTOR CONTROL APPARATUS

CROSS-REFERENCE TO RELATED APPLICATIONS

The present application is based on PCT filing PCT/JP2017/045879 filed Dec. 21, 2017, the entire contents of each of which being incorporated herein by reference.

FIELD

The present invention relates to a motor control apparatus that controls a motor that drives a machine apparatus that moves a subject to be moved.

BACKGROUND

A machine apparatus that moves a subject to be moved is known; such machine apparatus is driven by a motor and the motor is controlled by a motor control apparatus. An example of the subject to be moved is a table. Specifically, the motor control apparatus receives, from a controller, a command signal that specifies a destination position of the table, receives, from a detector that detects a rotational position of the motor, a detection signal that indicates the rotational position, and controls the motor on the basis of the command signal and the detection signal, which are received.

To control the motor, the motor control apparatus calculates a value of voltage to be applied to the motor on the basis of the command signal and the detection signal. When calculating a value of the voltage, the motor control apparatus converts a value indicated by the command signal to a signal that indicates a rotational position of the motor, considering a gear ratio of gears included in the machine apparatus, a pitch of a ball screw included in the machine apparatus, and resolution of the detector. That is, the motor control apparatus performs unit conversion.

Patent Literature 1 discloses a method for fraction arithmetic in unit conversion, where the numerator and denominator both have an integer term and a power-of-two term. Patent Literature 2 discloses a technique for acquiring information that indicates resolution by communication. Patent Literature 3 discloses a technique for conversion from a position command of resolution of a controller to an internal position command of resolution higher than the resolution of a position detector.

CITATION LIST

Patent Literature

Patent Literature 1: Japanese Patent Application Laid-open No. 2002-112566
Patent Literature 2: Japanese Patent Application Laid-open No. 2004-317261
Patent Literature 3: Japanese Patent Application Laid-open No. 2012-104047

SUMMARY

Technical Problem

A detector needs to be replaced when it is broken. The resolution of detectors is increasing year by year. When a detector needs to be replaced, a detector having the same resolution as the resolution of the detector to be replaced may not be available in some cases; in such cases, the motor control apparatus that has been used until the replacement of the detector cannot be used any longer.

The present invention has been achieved in view of the above, and an object of the present invention is to provide a motor control apparatus that, after a detector for detecting a rotational position of a motor or a position of a subject to be moved is replaced with another detector having higher resolution than resolution of a replaced detector, controls the motor with precision provided by resolution of the detector used before a replacement.

Solution to Problem

To solve the problem described above and achieve the object described above, the present invention provides a motor control apparatus that controls a motor that drives a machine apparatus that moves a subject to be moved, the motor control apparatus including a resolution conversion unit that converts, on the basis of a ratio of resolution of a first detector that detects a position of an object and resolution of a second detector that detects a position of the object, a detection signal that indicates the position of the object that is detected by the second detector to a signal of the resolution of the first detector. The present invention further includes a current control unit that controls a voltage to be applied to the motor on the basis of a command signal that specifies a destination position of the subject to be moved and the signal obtained by the conversion performed by the resolution conversion unit on the detection signal. The position of the object is a rotational position of the motor or a position of the subject to be moved.

Advantageous Effects of Invention

The motor control apparatus according to the present invention produces an effect of enabling control of a motor, after a detector for detecting a rotational position of a motor or a position of a subject to be moved is replaced with another detector having higher resolution than resolution of a replaced detector, controls the motor with precision provided by resolution of the detector used before a replacement.

DESCRIPTION OF EMBODIMENTS

Exemplary embodiments of a motor control apparatus according to the present invention are described in detail below with reference to the drawings. The present invention is not limited to the embodiments.

First Embodiment

Figure 1:
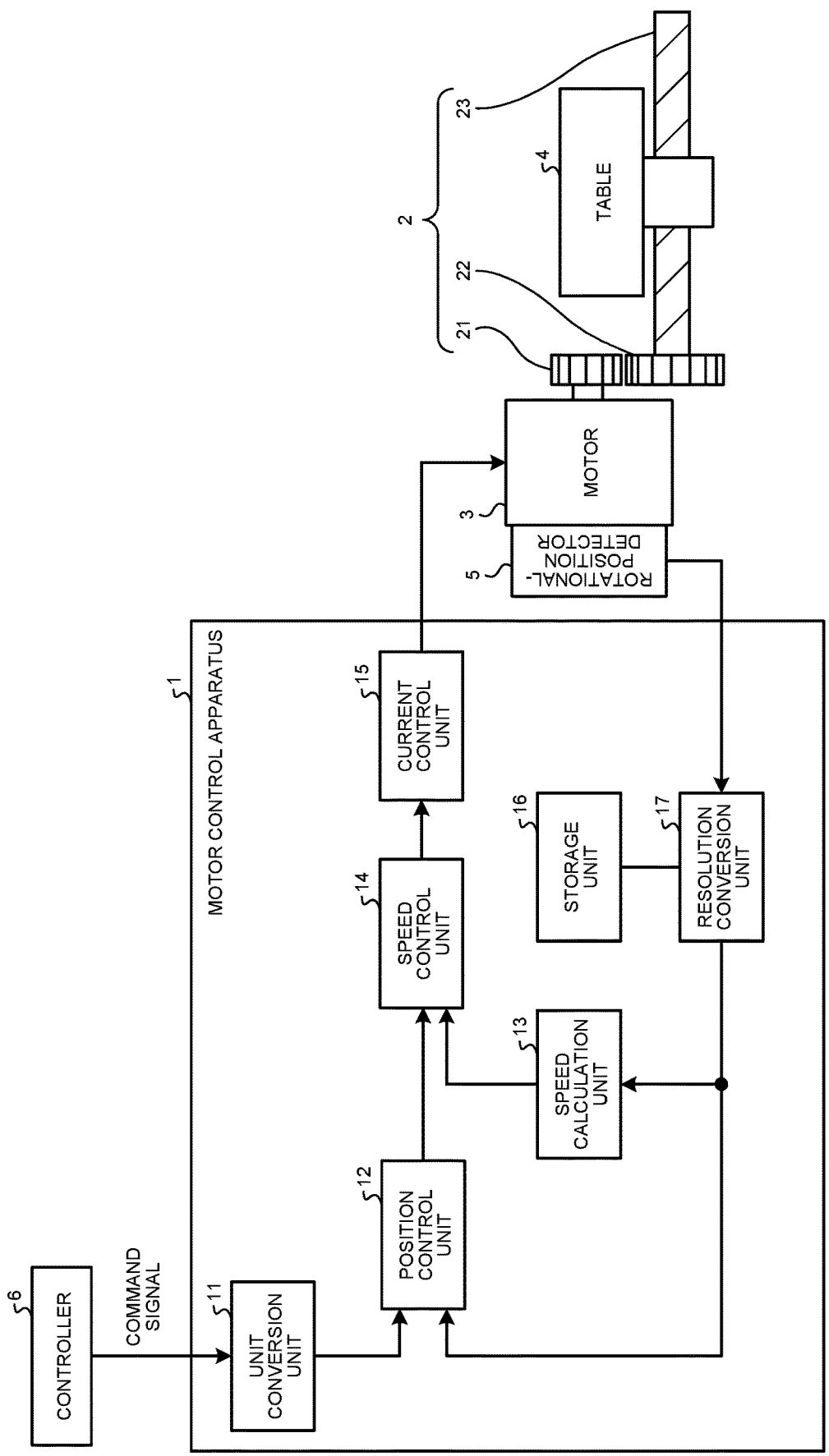
FIG. 1 is a diagram illustrating a configuration of a motor control apparatus according to a first embodiment.

FIG. 1 is a diagram illustrating a configuration of a motor control apparatus 1 according to a first embodiment. The motor control apparatus 1 is an apparatus that controls a motor 3 that drives a machine apparatus 2 that moves a subject to be moved. The machine apparatus 2 and the motor 3 are also illustrated in FIG. 1. In the first embodiment, the subject to be moved is a table 4. The table 4 is also illustrated in FIG. 1.

The machine apparatus 2 is described first. The machine apparatus 2 in the first embodiment is a table driving apparatus that converts a rotational motion of the motor 3 to a linear motion and drives the table 4; the machine apparatus 2 includes a first gear 21 and a second gear 22. The first gear 21 and the second gear 22 configure a speed reducer. The machine apparatus 2 also includes a ball screw 23. The first gear 21 and the second gear 22 mesh with each other and transfer a force of the rotational motion supplied by the motor 3 to the ball screw 23.

The first gear 21 is positioned relatively close to the motor 3 and relatively far from the table 4; the second gear 22 is positioned relatively far from the motor 3 and relatively close to the table 4. In the first embodiment, the number of teeth of the first gear 21 is defined as Gr1; the number of teeth of the second gear 22 is defined as Gr2.

The ball screw 23 is coupled to the table 4 and produces a linear motion based on a force supplied from the second gear 22, moving the table 4 on a predefined straight line. In the first embodiment, a movement quantity per rotation of the ball screw 23 is defined as PIT (mm).

A rotational-position detector 5 that detects the rotational position of the motor 3 is also illustrated in FIG. 1. In the first embodiment, the rotational-position detector 5 is replaced with a new rotational-position detector 5. The rotational-position detector 5 that is to be replaced may be referred to as a first rotational-position detector 5, and the replacing rotational-position detector 5 may be referred to as a second rotational-position detector 5. Resolution of the rotational-position detector 5 that is to be replaced is RNG. That is, the resolution of the first rotational-position detector 5 is RNG. RNG represents the number of pulses per rotation of the motor 3. The rotational position of the motor 3 is detected by one of the rotational-position detector 5 that is to be replaced and the replacing rotational-position detector 5; thus, only one rotational-position detector 5 is illustrated in FIG. 1.

The first rotational-position detector 5, which is the rotational-position detector 5 that is to be replaced, detects the rotational position of the motor 3 with precision of 360°/RNG. For example, when RNG is 1000, the first rotational-position detector 5 detects the rotational position of the motor 3 with precision of 360°/1000. A controller 6 that transmits a command signal that specifies a destination position of the table 4 to the motor control apparatus 1 is also illustrated in FIG. 1. In the first embodiment, a minimum unit for a value indicated by the command signal is defined as IU (mm). The controller 6 is located outside the motor control apparatus 1.

A configuration of the motor control apparatus 1 is described next. The motor control apparatus 1 includes a unit conversion unit 11 that converts the command signal, which is transmitted by the controller 6 to the motor control apparatus 1, to a signal that specifies the rotational position of the motor 3 by using an expression (1) described below. As described above, the command signal is a signal that specifies the destination position of the table 4. The expression (1) is an expression that expresses a unit conversion factor for use in the conversion of the command signal to the signal that specifies the rotational position of the motor 3.

[Formula 1]

$$\text{Unit conversion factor} = \frac{IU \times Gr2 \times RNG}{PIT \times Gr1} \quad (1)$$

It is assumed that IU, PIT, Gr1, and Gr2 are as follows: IU (mm)=1×10$^{-3}$ (mm), PIT (mm)=10 (mm), Gr1=10, and Gr2=20. When the value indicated by the command signal is 10000 with IU as the unit, the unit conversion unit 11 converts the command signal to the signal that specifies the rotational position of the motor 3 on the basis of an expression (2) described below. The expression (2) includes the unit conversion factor indicated by the expression (1).

[Formula 2]

$$\begin{aligned}\text{Rotational position of motor} &= \text{Command signal} \times \quad (2) \\ &\quad \text{Unit conversion factor} \\ &= 10000 \times \frac{10^{-3} \times 20 \times RNG}{10 \times 10} \\ &= 2 \times RNG\end{aligned}$$

That is, when IU, PIT, Gr1, Gr2, and the command signal are as described above, the unit conversion unit 11 converts the command signal from the controller 6 to a signal of "2×RNG" that specifies that the motor 3 makes two rotations.

Before transmitting the command signal to the motor control apparatus 1, the controller 6 transmits data that indicates IU, PIT, Gr1, and Gr2 to the motor control apparatus 1. The unit conversion unit 11 receives the data that indicates IU, PIT, Gr1, and Gr2 from the controller 6, calculates the unit conversion factor on the basis of the expression (1), and stores data that indicates the unit conversion factor that is calculated. The unit conversion unit 11 includes a storage unit and stores the data that indicates the calculated unit conversion factor in the storage unit. An example of the storage unit is a flash memory. When receiving the command signal from the controller 6, the unit conversion unit 11 converts the command signal to the signal that specifies the rotational position of the motor 3 on the basis of the expression (2).

The motor control apparatus 1 further includes a position control unit 12 that calculates a speed command that specifies the rotational speed of the motor 3 on the basis of the signal that specifies the rotational position of the motor 3, which is obtained by the unit conversion unit 11, and a detection signal that indicates a rotational position of the motor 3 detected by the rotational-position detector 5 that is to be replaced. Specifically, the position control unit 12 calculates the speed command by subtracting the rotational position of the motor 3 detected by the rotational-position detector 5 that is to be replaced from the rotational position of the motor 3 specified by the signal obtained by the unit conversion unit 11. The signal obtained by the unit conversion unit 11 is a signal resulting from the conversion performed by the unit conversion unit 11 on the command signal, which specifies the destination position of the table 4.

The motor control apparatus 1 further includes a speed calculation unit 13 that calculates the rotational speed of the motor 3 by differentiating the rotational position of the motor 3 that is detected by the rotational-position detector 5 that is to be replaced with respect to time. The motor control apparatus 1 further includes a speed control unit 14 that generates a current command that specifies a value of current to be applied to the motor 3 on the basis of the speed command, which is calculated by the position control unit 12, and the rotational speed of the motor 3 that is calculated by the speed calculation unit 13. Specifically, the speed control unit 14 calculates the current command by subtracting the rotational speed of the motor 3 that is calculated by the speed calculation unit 13 from the rotational speed of the motor 3 that is specified by the speed command, which is calculated by the position control unit 12.

The motor control apparatus 1 further includes a current control unit 15 that generates a voltage command that specifies a value of voltage to be applied to the motor 3 on the basis of the current command, which is generated by the speed control unit 14, and applies a voltage of the specified value to the motor 3. That is, before the rotational-position detector 5 is replaced with a new rotational-position detector 5, the current control unit 15 controls the voltage to be applied to the motor 3 on the basis of the command signal and the detection signal that indicates the rotational position of the motor 3 that is detected by the rotational-position detector 5 that is to be replaced.

The motor control apparatus 1 further includes a storage unit 16 that stores information that indicates the resolution of the rotational-position detector 5 that is to be replaced. That is, the storage unit 16 stores information that indicates the resolution of the first rotational-position detector 5. An example of the storage unit 16 is a flash memory. The motor control apparatus 1 further includes a resolution conversion unit 17 that, when the rotational-position detector 5 is replaced, calculates a scale factor of resolution of the replacing rotational-position detector 5 with respect to the resolution of the replaced rotational-position detector 5. The scale factor calculated by the resolution conversion unit 17 is hereinafter defined as "conversion scale factor". As described above, the replacing rotational-position detector 5 is the second rotational-position detector 5.

Specifically, the resolution conversion unit 17 receives information that indicates the resolution of the replacing rotational-position detector 5 from the replacing rotational-position detector 5 and calculates the conversion scale factor of the resolution of the replacing rotational-position detector 5 with respect to the resolution of the replaced rotational-position detector 5 by dividing the resolution of the replacing rotational-position detector 5, which is indicated by the received information, by the resolution of the replaced rotational-position detector 5, which is indicated by the information stored in the storage unit 16.

For example, if the resolution of the replaced rotational-position detector 5 is 1,048,576 (the number of pulses per rotation of the motor 3) and the resolution of the replacing rotational-position detector 5 is 4,194,304 (the number of pulses per rotation of the motor 3), the resolution conversion unit 17 calculates the conversion scale factor as "four times". Four times corresponds to two bits. The resolution conversion unit 17 includes a storage unit and stores data that indicates the calculated conversion scale factor in the storage unit. An example of the storage unit is a flash memory.

When the rotational-position detector 5 is replaced, the resolution conversion unit 17 divides a value indicated by a detection signal that indicates a rotational position of the motor 3 that is detected by the replacing rotational-position detector 5 by the conversion scale factor to convert the detection signal that indicates the rotational position of the motor 3 to a signal of the resolution of the replaced rotational-position detector 5. Specifically, when the rotational-position detector 5 is replaced, the resolution conversion unit 17 converts, on the basis of a ratio of the resolution of the first rotational-position detector 5, which detects a rotational position of the motor 3, and the resolution of the second rotational-position detector 5, which detects a rotational position of the motor 3, the detection signal that indicates the rotational position of the motor 3 that is detected by the second rotational-position detector 5 to a signal of the resolution of the first rotational-position detector 5. As described above, the first rotational-position detector 5 is the replaced rotational-position detector 5 and the second rotational-position detector 5 is the replacing rotational-position detector 5. Before the rotational-position detector 5 is replaced, the resolution conversion unit 17 outputs the detection signal that indicates the rotational position of the motor 3 detected by the replaced rotational-position detector 5 to the position control unit 12 and the speed calculation unit 13.

When the rotational-position detector 5 is replaced, the position control unit 12 calculates the speed command, which specifies the rotational speed of the motor 3, on the basis of the signal that specifies the rotational position of the motor 3, which is obtained by the unit conversion unit 11, and the signal obtained by the conversion performed by the resolution conversion unit 17 on the detection signal detected by the replacing rotational-position detector 5. The signal that indicates the rotational position of the motor 3 obtained by the unit conversion unit 11 is a signal resulting from the conversion performed by the unit conversion unit 11 on the command signal from the controller 6. The command signal from the controller 6 is a signal that specifies the destination position of the table 4. When the rotational-position detector 5 is replaced, the speed calculation unit 13 calculates the rotational speed of the motor 3 by differentiating a value indicated by the signal obtained by the resolution conversion unit 17 with time.

When the rotational-position detector 5 is replaced, the current control unit 15 generates the voltage command, which specifies a value of voltage to be applied to the motor 3, on the basis of the current command that is generated by the speed control unit 14 after the rotational-position detector 5 is replaced, and applies a voltage of the specified value to the motor 3. That is, when the rotational-position detector 5 is replaced, the current control unit 15 controls the voltage to be applied to the motor 3 on the basis of the command signal and the signal obtained by the conversion performed by the resolution conversion unit 17 on the detection signal detected by the replacing rotational-position detector 5.

Generally, the resolution of the rotational-position detector 5 is a power of two. When a central processing unit (CPU) achieves a function of the resolution conversion unit 17, the CPU converts a value indicated by the detection signal detected by the replacing rotational-position detector 5 to a signal of the resolution of the replaced rotational-position detector 5 by performing a shift operation on the basis of a bit number corresponding to the calculated conversion scale factor.

Figure 2:
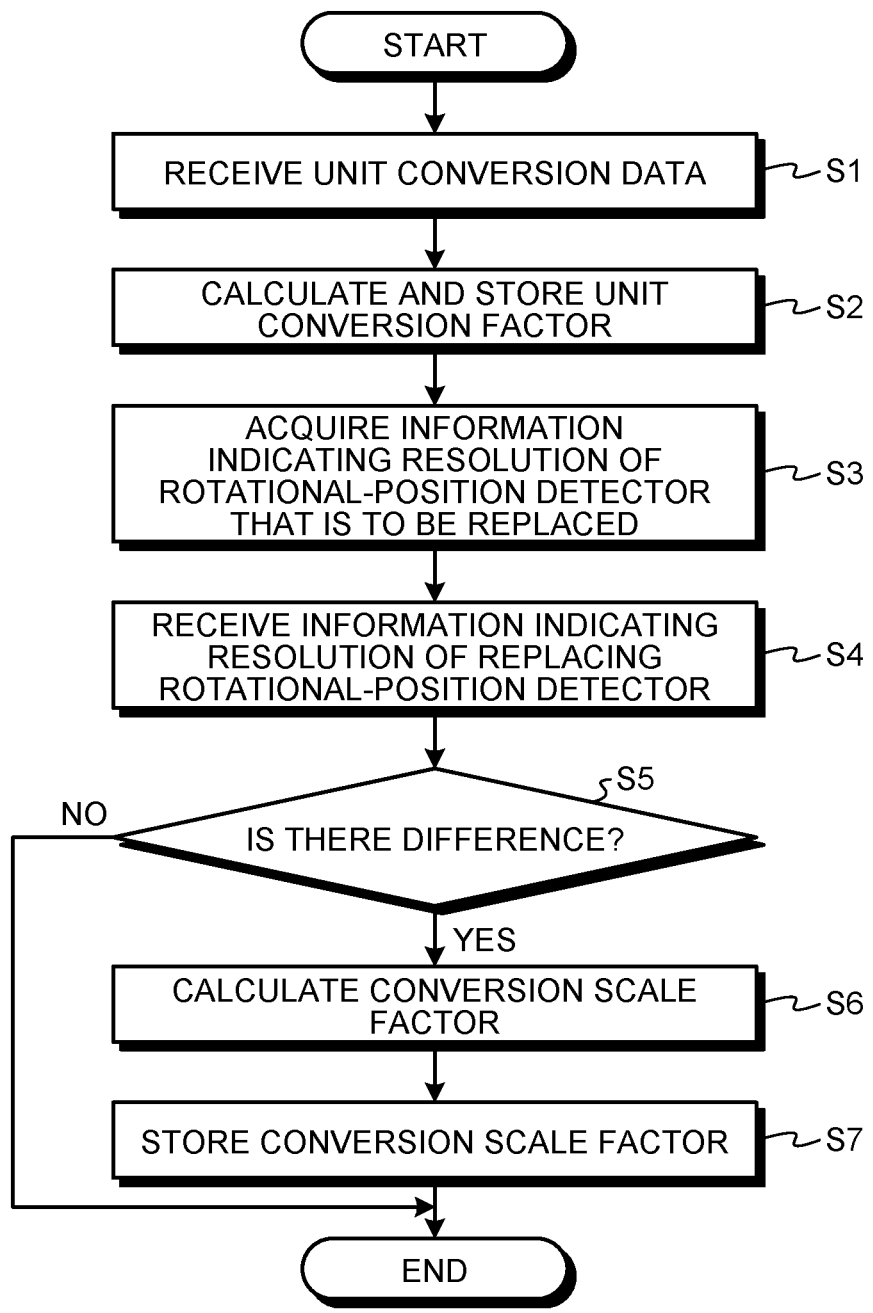
FIG. 2 is a flowchart indicating portions of operations of a unit conversion unit and a resolution conversion unit that are included in the motor control apparatus according to the first embodiment.

FIG. 2 is a flowchart indicating portions of the operations of the unit conversion unit 11 and the resolution conversion unit 17, which are included in the motor control apparatus 1 according to the first embodiment. When the rotational-position detector 5 is replaced, the unit conversion unit 11, upon start of the motor control apparatus 1, receives unit conversion data that is data for calculating the unit conversion factor, which is expressed by the expression (1) described above, from the controller 6 (S1). The unit conversion unit 11 calculates the unit conversion factor on the basis of the unit conversion data and stores data that indicates the unit conversion factor (S2). The resolution conversion unit 17 acquires the information that indicates the resolution of the replaced rotational-position detector 5 from the storage unit 16 (S3) and receives the information that indicates the resolution of the replacing rotational-position detector 5 from the replacing rotational-position detector 5 (S4).

The resolution conversion unit 17 determines whether there is a difference between the resolution indicated by the information acquired in step S3 and the resolution indicated by the information received in step S4 (S5). If it is determined that there is no difference between the two of the resolution (No in S5), the resolution conversion unit 17 terminates the operation for calculating the conversion scale factor. If it is determined that there is a difference between the two of the resolution (Yes in S5), the resolution conversion unit 17 calculates (S6) the conversion scale factor by dividing the resolution indicated by the information received in step S4 by the resolution indicated by the information acquired in step S3. The resolution conversion unit 17 stores (S7) data that indicates the conversion scale factor calculated in step S6.

After the unit conversion unit 11 stores the data that indicates the unit conversion factor and the resolution conversion unit 17 stores the data that indicates the conversion scale factor calculated after the replacement of the rotational-position detector 5, the unit conversion unit 11, upon receiving the command signal from the controller 6, converts the command signal to the signal that specifies the rotational position of the motor 3 on the basis of the expression (2). The position control unit 12 calculates the speed command, which specifies the rotational speed of the motor 3, on the basis of the signal that specifies the rotational position of the motor 3, which is obtained by the unit conversion unit 11, and the signal obtained by the conversion performed by the resolution conversion unit 17 on the detection signal detected by the replacing rotational-position detector 5.

The speed calculation unit 13 calculates the rotational speed of the motor 3 by differentiating a value indicated by the signal obtained by the resolution conversion unit 17 with time. The speed control unit 14 generates the current command, which specifies a value of current to be applied to the motor 3, on the basis of the speed command, which is calculated by the position control unit 12, and the rotational speed of the motor 3 that is calculated by the speed calculation unit 13. The current control unit 15 generates the voltage command, which specifies a value of voltage to be applied to the motor 3, on the basis of the current command, which is generated by the speed control unit 14, and applies a voltage of the specified value to the motor 3.

As described above, when the rotational-position detector 5, which detects the rotational position of the motor 3, is replaced, the motor control apparatus 1 converts, on the basis of the ratio of the resolution of the first rotational-position detector 5, which is the replaced rotational-position detector 5, and the resolution of the second rotational-position detector 5, which is the replacing rotational-position detector 5, the detection signal that indicates the rotational position of the motor 3 that is detected by the second rotational-position detector 5 to a signal of the resolution of the first rotational-position detector 5. The motor control apparatus 1 controls the voltage to be applied to the motor 3 on the basis of the command signal, which specifies the destination position of the table 4, which is a subject to be moved, and the signal obtained by the conversion performed on the detection signal described above.

The motor control apparatus 1 can thus control the motor 3 with the precision provided by the resolution of the first rotational-position detector 5, which is the rotational-position detector 5 that is to be replaced, after the first rotational-position detector 5 is replaced by the second rotational-position detector 5, which has resolution different from the resolution of the first rotational-position detector 5.

In the first embodiment described above, the resolution conversion unit 17 receives the information that indicates the resolution of the replacing rotational-position detector 5 from the replacing rotational-position detector 5. Alternatively, the resolution conversion unit 17 may receive the information that indicates the resolution of the replacing rotational-position detector 5 from the controller 6. The resolution conversion unit 17 may receive the information that indicates the resolution of the rotational-position detector 5 that is to be replaced from the rotational-position detector 5 that is to be replaced or from the controller 6. In any of the cases, the storage unit 16 stores the information that indicates the resolution of the rotational-position detector 5 that is to be replaced. The resolution conversion unit 17 converts the detection signal detected by the replacing rotational-position detector 5 to a signal of the resolution of the replaced rotational-position detector 5 on the basis of the ratio of the resolution of the replaced rotational-position detector 5 and the resolution of the replacing rotational-position detector 5.

The machine apparatus 2 in the first embodiment described above is a table driving apparatus that converts a rotational motion of the motor 3 to a linear motion and drives the table 4, and the number of motors 3 illustrated in FIG. 1 is one. The machine apparatus 2 may include two motors 3. One of the two motors 3 is to give a linear motion to the table 4 on an X axis and the other one of the two motors 3 is to give a linear motion to the table 4 on a Y axis that is orthogonal to the X axis. If the machine apparatus 2 includes two motors 3, the motor control apparatus 1 performs the operation described above for each of the two motors 3.

Figure 3:
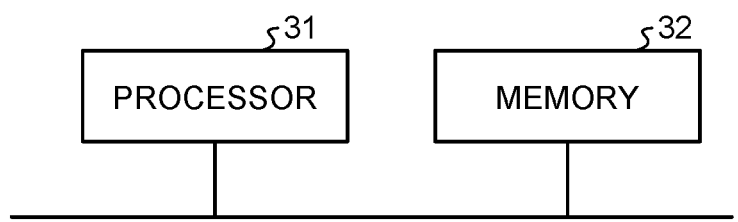
FIG. 3 is a diagram illustrating a processor that is used when at least a portion of functions of the unit conversion unit, a position control unit, a speed calculation unit, a speed control unit, a current control unit, and the resolution conversion unit, which are included in the motor control apparatus according to the first embodiment, is achieved by the processor.

FIG. 3 is a diagram illustrating a processor 31 that is used when at least a portion of functions of the unit conversion unit 11, the position control unit 12, the speed calculation unit 13, the speed control unit 14, the current control unit 15, and the resolution conversion unit 17, which are included in the motor control apparatus 1 according to the first embodiment, is achieved by the processor 31. That is, at least a portion of the function of the unit conversion unit 11, the position control unit 12, the speed calculation unit 13, the speed control unit 14, the current control unit 15, and the resolution conversion unit 17 may be achieved by the processor 31, which executes a program stored in a memory 32. The processor 31 is a CPU, a processing unit, an arithmetic unit, a microprocessor, a microcomputer, or a digital signal processor (DSP). The memory 32 is also illustrated in FIG. 3.

When at least a portion of the function of the unit conversion unit 11, the position control unit 12, the speed calculation unit 13, the speed control unit 14, the current control unit 15, and the resolution conversion unit 17 is achieved by the processor 31, the portion of the function is achieved by a combination of the processor 31, and software, firmware, or software and firmware. The software or firmware is described as a program and stored in the memory 32. At least a portion of the function of the unit conversion unit 11, the position control unit 12, the speed calculation unit 13, the speed control unit 14, the current control unit 15, and the resolution conversion unit 17 is achieved by the processor 31 reading out to execute the program stored in the memory 32.

When at least a portion of the function of the unit conversion unit 11, the position control unit 12, the speed calculation unit 13, the speed control unit 14, the current control unit 15, and the resolution conversion unit 17 is achieved by the processor 31, the motor control apparatus 1 includes the memory 32 for storing a program that results in execution of steps executed by at least a portion of the unit conversion unit 11, the position control unit 12, the speed calculation unit 13, the speed control unit 14, the current control unit 15, and the resolution conversion unit 17. It can be also said that the program stored in the memory 32 causes a computer to execute a procedure or method executed by at least a portion of the unit conversion unit 11, the position control unit 12, the speed calculation unit 13, the speed control unit 14, the current control unit 15, and the resolution conversion unit 17.

The memory 32 is, for example, a nonvolatile or volatile semiconductor memory, such as a random access memory (RAM), a read only memory (ROM), a flash memory, an erasable programmable read only memory (EPROM), an electrically erasable programmable read-only memory (EEPROM, which is a registered trademark), a magnetic disk, a flexible disk, an optical disk, a compact disk, a mini disk, a digital versatile disc (DVD), or the like.

Figure 4:
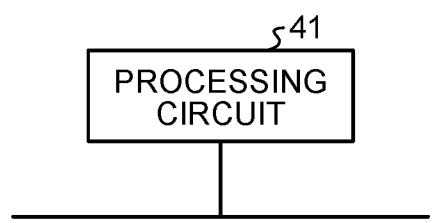
FIG. 4 is a diagram illustrating a processing circuit that is used when at least one of constituent elements configuring the unit conversion unit, the position control unit, the speed calculation unit, the speed control unit, the current control unit, and the resolution conversion unit, which are included in the motor control apparatus according to the first embodiment, is achieved by the processing circuit.

FIG. 4 is a diagram illustrating a processing circuit 41 that is used when at least one of constituent elements configuring the unit conversion unit 11, the position control unit 12, the speed calculation unit 13, the speed control unit 14, the current control unit 15, and the resolution conversion unit 17, which are included in the motor control apparatus 1 according to the first embodiment, is achieved by the processing circuit 41. That is, at least a portion of functions of the unit conversion unit 11, the position control unit 12, the speed calculation unit 13, the speed control unit 14, the current control unit 15, and the resolution conversion unit 17 may be achieved by the processing circuit 41.

The processing circuit 41 is dedicated hardware. The processing circuit 41 is, for example, a single circuit, a compound circuit, a programmed processor, a parallel programmed processor, an application specific integrated circuit (ASIC), a field-programmable gate array (FPGA), or a combination of them. A portion of the unit conversion unit 11, the position control unit 12, the speed calculation unit 13, the speed control unit 14, the current control unit 15, and the resolution conversion unit 17 may be dedicated hardware separate from hardware of the remaining portions.

A portion of functions of the unit conversion unit 11, the position control unit 12, the speed calculation unit 13, the speed control unit 14, the current control unit 15, and the resolution conversion unit 17 may be achieved by software or firmware, and the remaining portions of the functions may be achieved by dedicated hardware. As described above, the functions of the unit conversion unit 11, the position control unit 12, the speed calculation unit 13, the speed control unit 14, the current control unit 15, and the resolution conversion unit 17 can be achieved by hardware, software, firmware, or a combination of them.

Second Embodiment

Figure 5:
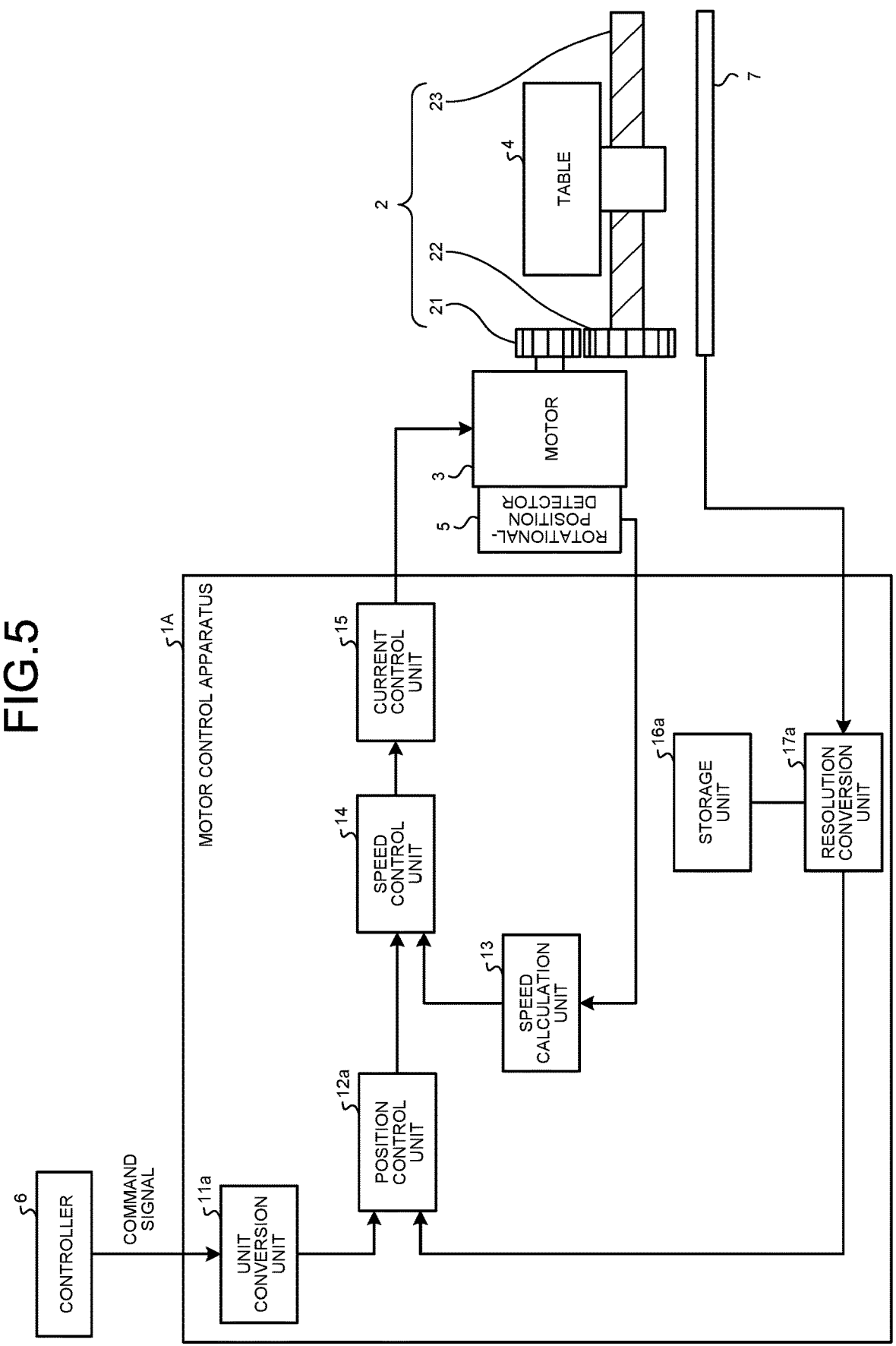
FIG. 5 is a diagram illustrating a configuration of a motor control apparatus according to a second embodiment.

FIG. 5 is a diagram illustrating a configuration of a motor control apparatus 1A according to a second embodiment. The motor control apparatus 1A includes the speed calculation unit 13, the speed control unit 14, and the current control unit 15, which are included in the motor control apparatus 1 according to the first embodiment. The unit conversion unit 11 in the first embodiment is replaced by a unit conversion unit 11a, and the position control unit 12 in the first embodiment is replaced by a position control unit 12a. The storage unit 16 in the first embodiment is replaced by a storage unit 16a. An example of the storage unit 16a is a flash memory. The resolution conversion unit 17 is replaced by a resolution conversion unit 17a.

A machine-end detector 7 that detects the position of the table 4 is used in the second embodiment. Specifically, the machine-end detector 7 directly detects the position of the table 4. Each of the rotational-position detector 5 and the machine-end detector 7 transmits a detection signal to the motor control apparatus 1A in the second embodiment. A scheme in which each of the rotational-position detector 5 and the machine-end detector 7 transmits a detection signal to the motor control apparatus 1A is a fully-closed control scheme. In the second embodiment, the rotational-position detector 5 is not replaced and the machine-end detector 7 is replaced. Difference from the first embodiment is mainly described in the second embodiment.

The machine-end detector 7 detects the position of the table 4 without being affected by the first gear 21 and the second gear 22. Resolution of the machine-end detector 7 is defined as PIT (mm), which is a movement quantity per rotation of the ball screw 23. The unit conversion unit 11a converts a command signal that is transmitted by the controller 6 to the motor control apparatus 1A to a signal that specifies the rotational position of the motor 3 by using an expression (3) described below. The command signal is a signal that specifies a destination position of the table 4. The expression (3) is an expression that expresses a unit conversion factor for use in the conversion of the command signal to the signal that specifies the rotational position of the motor 3.

[Formula 3]

$$\text{Unit conversion factor} = \frac{IU \times RNG}{PIT} \quad (3)$$

The storage unit 16a stores information that indicates the resolution of the machine-end detector 7 that is to be replaced. When the machine-end detector 7 is replaced, the resolution conversion unit 17a calculates a conversion scale factor of resolution of a replacing machine-end detector 7 with respect to the resolution of the replaced machine-end detector 7. Specifically, the resolution conversion unit 17a receives information that indicates the resolution of the replacing machine-end detector 7 from the replacing machine-end detector 7 and calculates the conversion scale factor of the resolution of the replacing machine-end detector 7 with respect to the resolution of the replaced machine-end detector 7 by dividing the resolution of the replacing machine-end detector 7, which is indicated by the received information, by the resolution of the replaced machine-end detector 7, which is indicated by the information stored in the storage unit 16a.

The resolution conversion unit 17a includes a storage unit and stores data that indicates the calculated conversion scale factor in the storage unit. An example of the storage unit is a flash memory. The replaced machine-end detector 7 is a first machine-end detector 7 and the replacing machine-end detector 7 is a second machine-end detector 7.

When the machine-end detector 7 is replaced, the resolution conversion unit 17a divides a value indicated by the detection signal that indicates a position of the table 4 detected by the replacing machine-end detector 7 by the conversion scale factor to convert the detection signal that indicates the position of the table 4 that is detected by the replacing machine-end detector 7 to a signal of the resolution of the replaced machine-end detector 7. Specifically, when the machine-end detector 7 is replaced, the resolution conversion unit 17a converts the detection signal that indicates the position of the table 4 that is detected by the second machine-end detector 7 to a signal of the resolution of the first machine-end detector 7 on the basis of a ratio of the resolution of the first machine-end detector 7 and the resolution of the second machine-end detector 7.

The position control unit 12a has a function of converting the position of the table 4 to the rotational position of the motor 3. Before the machine-end detector 7 is replaced, the position control unit 12a uses this function and calculates a speed command that specifies the rotational speed of the motor 3 on the basis of the signal that specifies the rotational position of the motor 3, which is obtained by the unit conversion unit 11a, and the detection signal detected by the machine-end detector 7. When the machine-end detector 7 is replaced, the position control unit 12a uses this function and calculates the speed command, which specifies the rotational speed of the motor 3, on the basis of the signal that specifies the rotational position of the motor 3, which is obtained by the unit conversion unit 11a, and a signal obtained by the conversion performed by the resolution conversion unit 17a on the detection signal detected by the replacing machine-end detector 7. The current control unit 15 controls the voltage to be applied to the motor 3 on the basis of the command signal, which specifies the destination position of the table 4, which is a subject to be moved, and the signal obtained by the conversion performed by the resolution conversion unit 17a on the detection signal.

When the machine-end detector 7 is replaced, the motor control apparatus 1A in the second embodiment converts, on the basis of the ratio of the resolution of the first machine-end detector 7, which is the replaced machine-end detector 7, and the resolution of the second machine-end detector 7, which is the replacing machine-end detector 7, the detection signal that indicates the position of the table 4 that is detected by the second machine-end detector 7 to a signal of the resolution of the first machine-end detector 7. The motor control apparatus 1A controls the voltage to be applied to the motor 3 on the basis of the command signal, which specifies the destination position of the table 4, which is a subject to be moved, and the signal obtained by the conversion performed on the detection signal described above.

The motor control apparatus 1A can thus control the motor 3 with the precision provided by the resolution of the first machine-end detector 7, which is the replaced machine-end detector 7, after the first machine-end detector 7 is replaced by the second machine-end detector 7, which has resolution different from the resolution of the first machine-end detector 7.

In the second embodiment described above, the resolution conversion unit 17a receives the information that indicates the resolution of the replacing machine-end detector 7 from the replacing machine-end detector 7. Alternatively, the resolution conversion unit 17a may receive the information that indicates the resolution of the replacing machine-end detector 7 from the controller 6. The resolution conversion unit 17a may receive the information that indicates the resolution of the replaced machine-end detector 7 from the replaced machine-end detector 7 or from the controller 6. In any of the cases, the storage unit 16a stores information that indicates the resolution of the replaced machine-end detector 7. The resolution conversion unit 17a converts the detection signal detected by the replacing machine-end detector 7 to a signal of the resolution of the replaced machine-end detector 7 on the basis of the ratio of the resolution of the replaced machine-end detector 7 and the resolution of the replacing machine-end detector 7.

At least a portion of a function of the unit conversion unit 11a, the position control unit 12a, the speed calculation unit 13, the speed control unit 14, the current control unit 15, and the resolution conversion unit 17a may be achieved by a processor that has the same function as the processor 31 in the first embodiment. In this case, the motor control apparatus 1A includes a memory for storing a program that results in execution of steps executed by at least a portion of the unit conversion unit 11a, the position control unit 12a, the speed calculation unit 13, the speed control unit 14, the current control unit 15, and the resolution conversion unit 17a. This memory has the same function as the memory 32 in the first embodiment.

At least one of constituent elements configuring the unit conversion unit 11a, the position control unit 12a, the speed calculation unit 13, the speed control unit 14, the current control unit 15, and the resolution conversion unit 17a may be achieved by a processing circuit that has the same function as the processing circuit 41 in the first embodiment.

Note that the configurations described in the foregoing embodiments are examples of the present invention; combining the present invention with other publicly known techniques is possible, and partial omissions or modifications are possible without departing from the spirit of the present invention.

REFERENCE SIGNS LIST 1, 1A motor control apparatus; 2 machine apparatus; 3 motor; 4 table; 5 rotational-position detector; 6 controller; 7 machine-end detector; 11, 11a unit conversion unit; 12, 12a position control unit; 13 speed calculation unit; 14 speed control unit; 15 current control unit; 16, 16a storage unit; 17, 17a resolution conversion unit; 21 first gear; 22 second gear; 23 ball screw; 31 processor; 32 memory; 41 processing circuit.

The invention claimed is:

1. A motor control apparatus that controls a motor that drives a machine apparatus that moves a subject to be moved, the motor control apparatus comprising:

resolution conversion circuitry to convert, on a basis of a ratio of resolution of a first detector that detects a position of an object and resolution of a second detector that detects a position of the object, a detection signal that indicates the position of the object that is detected by the second detector to a signal of the resolution of the first detector; and current control circuitry to control a voltage to be applied to the motor on a basis of a command signal that specifies a destination position of the subject to be moved and the signal obtained by the conversion performed by the resolution conversion circuitry on the detection signal, wherein the position of the object is a rotational position of the motor or a position of the subject to be moved.

2. The motor control apparatus according to claim 1, wherein the resolution conversion circuitry receives information that indicates the resolution of the first detector from the first detector or from a controller that is placed outside the motor control apparatus, receives information that indicates the resolution of the second detector from the second detector or from the controller, and converts the detection signal to the signal of the resolution of the first detector on a basis of a ratio of the resolution of the first detector and the resolution of the second detector indicated by the received information.

* * * * *